US010232370B2

(12) United States Patent
Fringes et al.

(10) Patent No.: US 10,232,370 B2
(45) Date of Patent: Mar. 19, 2019

(54) MICROFLUIDIC RATCHETS FOR DISPLACING PARTICLES

(71) Applicant: International Business Machines Corporation, Armonk, NY (US)

(72) Inventors: Stefan Fringes, Schwabhausen (DE); Armin W. Knoll, Adliswil (CH); Colin Rawlings, Adliswil (CH); Christian Schwemmer, Zurich (CH); Michael Skaug, Boulder, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/800,554

(22) Filed: Nov. 1, 2017

(65) Prior Publication Data

US 2018/0272341 A1 Sep. 27, 2018

Related U.S. Application Data

(63) Continuation of application No. 15/469,995, filed on Mar. 27, 2017.

(51) Int. Cl.
*B03C 5/02* (2006.01)
*B01L 3/00* (2006.01)
*B01D 61/42* (2006.01)

(52) U.S. Cl.
CPC ........ *B01L 3/50273* (2013.01); *B01D 61/427* (2013.01); *B01L 2200/0652* (2013.01);
(Continued)

(58) Field of Classification Search
CPC .. B03C 5/00; B03C 5/02; B03C 5/024; B01L 3/50273; B01L 3/502761;
(Continued)

(56) References Cited

U.S. PATENT DOCUMENTS 6,001,266 A * 12/1999 Bier ................... B01D 21/0009
204/571
6,537,433 B1 * 3/2003 Bryning ............ B01L 3/502761
204/450

(Continued)

OTHER PUBLICATIONS

Bader et al., "DNA transport by a micromachined Brownian ratchet device", PNAS, Nov. 1999, p. 13165-13169.*
(Continued)

*Primary Examiner* — Joseph C Rodriguez
(74) *Attorney, Agent, or Firm* — CANTOR COLBURN LLP; Daniel Morris (57) ABSTRACT

Embodiments of the invention include a microfluidic device, which comprises a substrate with a channel defined therein, on an upper surface of the substrate, wherein a bottom wall of the channel comprises several contiguous steps having an asymmetric profile along a main direction of the channel, so as to form a ratchet topography. The device further comprises a lid, opposite to and at a distance from the upper surface of the substrate, so as to face the bottom wall of the channel. The bottom wall and the lid are designed to allow like sign charges to accumulate thereat, in presence of a polar liquid confined in the channel between the bottom wall and the lid, so as to allow displacement of nanoscale particles in the polar liquid, along said main direction of the channel, under application of an alternating force to said nanoscale particles, in operation of the device.

3 Claims, 3 Drawing Sheets

(52) U.S. Cl.
CPC ... *B01L 2300/04* (2013.01); *B01L 2300/0851* (2013.01); *B01L 2400/0415* (2013.01); *B03C 5/02* (2013.01); *B03C 5/024* (2013.01)

(58) Field of Classification Search
CPC ......... B01L 2200/0652; B01L 2300/04; B01L 2300/0851; B01L 2400/0415; B01D 61/427
See application file for complete search history.

(56) References Cited

U.S. PATENT DOCUMENTS

| | | | | |
|---|---|---|---|---|
| 6,749,736 | B1* | 6/2004 | Fuhr | B01L 3/502761 204/600 |
| 6,824,664 | B1* | 11/2004 | Austin | B01L 3/502761 204/643 |
| RE42,315 | E * | 5/2011 | Lopez | G01N 27/44773 204/450 |
| 8,257,666 | B2* | 9/2012 | Quake | B01F 5/0646 137/1 |
| 8,783,466 | B2* | 7/2014 | Han | B01D 61/027 204/450 |
| 9,149,813 | B2* | 10/2015 | Muller | B03C 5/005 |
| 9,534,304 | B2* | 1/2017 | Marziali | B01D 57/02 |
| 9,739,751 | B2* | 8/2017 | Tirapu Azpiroz | G01N 27/44791 |
| 9,822,403 | B2* | 11/2017 | Beer | C12Q 1/686 |
| 9,937,498 | B2* | 4/2018 | Yobas | B01L 3/502746 |
| 2004/0011650 | A1* | 1/2004 | Zenhausern | B01L 3/502746 204/547 |
| 2005/0072676 | A1* | 4/2005 | Cummings | B03C 5/026 204/547 |
| 2009/0321264 | A1* | 12/2009 | Harrold | B01D 57/02 204/660 |
| 2010/0190198 | A1* | 7/2010 | Kibar | B01J 19/087 435/29 |

OTHER PUBLICATIONS

Fringes et al., "Microfluidic Ratchets for Displacing Particles," U.S. Appl. No. 15/469,995, filed Mar. 27, 2017.
List of IBM Patents or Patent Applications Treated As Related; Date Filed: Nov. 1, 2017, 2 pages.

* cited by examiner

MICROFLUIDIC RATCHETS FOR DISPLACING PARTICLES

DOMESTIC PRIORITY

This application is a continuation of U.S. application Ser. No. 15/469,995, filed Mar. 27, 2017, the contents of which are incorporated by reference herein in its entirety.

BACKGROUND

The invention relates in general to the field of micro- or nanofluidic devices with channels having ratchet topographies, and in particular to devices that enable rocking ratchets.

Microfluidics generally refers to microfabricated devices, which are used for pumping, sampling, mixing, analyzing and dosing liquids. Prominent features thereof originate from the peculiar behavior that liquids exhibit at the micrometer length scale. Volumes well below one nanoliter can be reached by fabricating structures with lateral dimensions in the micrometer range. Many microfluidic devices have user chip interfaces and closed flowpaths. Closed flowpaths facilitate the integration of functional elements (e.g., heaters, mixers, pumps, UV detector, valves, etc.) into one device while minimizing problems related to leaks and evaporation. Nanofluidic devices are similar devices, though at least some of the characteristics dimensions of liquid-containing features reach the nanometer range.

Devices that can shuttle, separate, mix and collect nanoscale particles (such as a metallic nanoparticle, quantum dots or biomolecules) have immediate applications in nanofluidics, ranging from material science to lab on chip devices for point of care diagnostics and bio-chemistry.

Inspired by molecular motors in biology, artificial Brownian motors were proposed for selective particle transport using an asymmetric energy landscape and non-equilibrium fluctuations. Previous experimental investigations of such Brownian motors focused on mechanisms that exploit isotropic diffusion and a periodically generated, asymmetric trapping potential to transport micron scale particles. The required potentials were obtained using optical or dielectrophoretic forces, which scale with particle volume and are therefor not efficient at the nanoscale. In particular, the transport of DNA molecules was demonstrated using direct charge-charge interactions with intercalated electrodes.

While flashing ratchets rely on diffusion, designs of rocking ratchets have been proposed that may generate directed particle motion based on a fluctuating external force and a static potential landscape. However, to date, rocking Brownian motors have not been experimentally demonstrated for nanoscale particles, owing to the difficulty of creating a sufficiently strong and reliable static energy landscape.

SUMMARY

According to a aspects of the present invention, embodiments of the invention are directed to a microfluidic device. An example device comprises a substrate with a channel defined therein, on an upper surface of the substrate, wherein a bottom wall of the channel comprises several contiguous steps having an asymmetric profile along a main direction of the channel, so as to form a ratchet topography. The device further comprises a lid, opposite to and at a distance from the upper surface of the substrate, so as to face the bottom wall of the channel. The bottom wall and the lid are designed to allow like sign charges to accumulate thereat, in presence of a polar liquid confined in the channel between the bottom wall and the lid, so as to allow displacement of nanoscale particles in the polar liquid, along said main direction of the channel, under application of an alternating force to said nanoscale particles, in operation of the device.

The device can further comprise electrodes configured to allow an alternating electric field to be applied, so as to apply a force on nanoscale particles in a polar liquid confined in the channel. The bottom wall and the lid are designed to allow displacement of the nanoscale particles under application of said alternating electric field, without net motion of the polar liquid, in operation.

In some embodiments, the above channel is a first channel (forming a first ratchet topography) and the device further comprises a second channel defined in the substrate, on said upper surface of the substrate, wherein a bottom wall of the second channel comprises several contiguous steps having an asymmetric profile along a main direction of the second channel, so as to form a second ratchet topography. The lid faces each of the first channel and the second channel, which extend contiguously, so as to form a pair of contiguous channels, wherein nanoscale particles in a polar liquid that are in one of the contiguous channels can pass in the other one of the contiguous channels, in operation. An average depth of the second channel is larger than an average depth of the first channel, as measured in a direction perpendicular to an average plane of the substrate, wherein the second channel is recessed from the first channel, so as for larger ones of the nanoscale particles to be most likely present in the second channel, in operation. The asymmetric profiles of the contiguous channels are designed so as to allow a displacement of nanoscale particles in the second channel that is opposite to the displacement of nanoscale particles in the first channel, under application of said alternating force.

In some embodiments, an average width of the second channel is less than an average width of the first channel, as measured in a direction parallel to said average plane of the substrate and perpendicular to a main direction of any of the channels.

According other aspects of the invention, embodiments of the invention are directed to a microfluidic system comprising a microfluidic device with electrodes, such as described above, as well as a voltage controller adapted for applying a voltage to said electrodes.

According to other aspects of the invention, embodiments of the invention are directed to a method for displacing nanoscale particles in a microfluidic device such as described above. The method comprises: providing said microfluidic device with nanoscale particles in a polar liquid confined in the channel of the device; and applying an alternating force to nanoscale particles in said liquid to displace the nanoscale particles along a main direction of said channel.

In embodiments of the invention, the above method is implemented in a device comprising multiple channels, as evoked above. Here, the microfluidic device is provided with nanoscale particles of different sizes, in a liquid confined in the channels of the device. An alternating force is applied to said particles to displace them along the channels, so as for smaller ones of the particles to be more likely displaced in one direction along the first channel and larger ones of the particles to be more likely displaced, in a direction opposite to said one direction, along the second channel.

Devices, apparatuses and methods embodying the present invention will now be described, by way of non-limiting examples, and in reference to the accompanying drawings.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

In reference to FIGS. 1-5, an aspect of the invention is first described, which concerns a microfluidic device 1, 1a. While the terminology "microfluidic" device is adopted here, it is to be understood that characteristic dimensions of some features of the present devices will be in the nanometer or the micrometer range. In all cases, liquid volumes well below one nanoliter can be reached by fabricating structures with lateral dimensions in the nano- or micrometer range. However, vertical dimensions (such as the amplitude of height variations of the steps involved in the ratchets) may typically be in the nanometer range, such that the present devices can equally be regarded as nanofluidic devices. Also, present devices allow motion of nanoparticles, i.e., nanoscopic scale (or nanoscale) particles, having at least one characteristic dimension in the range of 1 to 100 nanometers (e.g., their average diameter will typically be in that range). However, applications can be contemplated, which involve somewhat larger particles (e.g., 100-500 nm).

Basically, the present devices 1, 1a comprise a substrate 10 with at least one channel 11, 12 defined therein. More precisely, this channel 11, 12 is defined on an upper surface 13 of the substrate 10, in a superficial thickness thereof. As for instance seen in FIG. 1 or 5, the bottom wall of this channel 11, 12 exhibits several contiguous steps 110, 120. These steps have an asymmetric profile along a main direction x of the channel 11, 12, so as to form a (linear) ratchet topography. That is, the steps of a channel are designed to allow step-by-step, linear motion of a nanoscale particle in only one direction x, while preventing motion thereof in the opposite direction. A "ratchet" as used herein accordingly means a topography that allows or, at least, strongly favors a step-by-step motion in one direction only.

Figure 1:
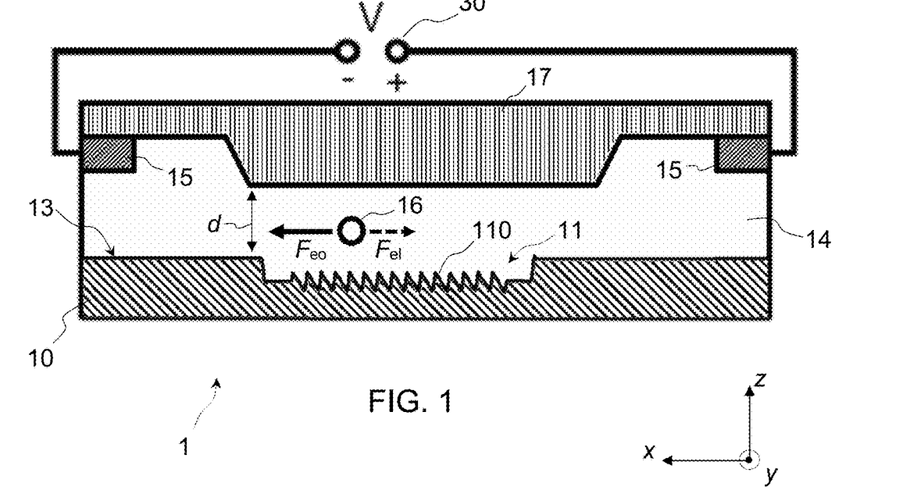
FIG. 1 is a two-dimensional (2D) cross-sectional view of a ratchet device, according to embodiments. The cross section depicts main components of the device, at the level of a longitudinal cutting plane (x, z), passing through a ratchet channel.
Figure 5:
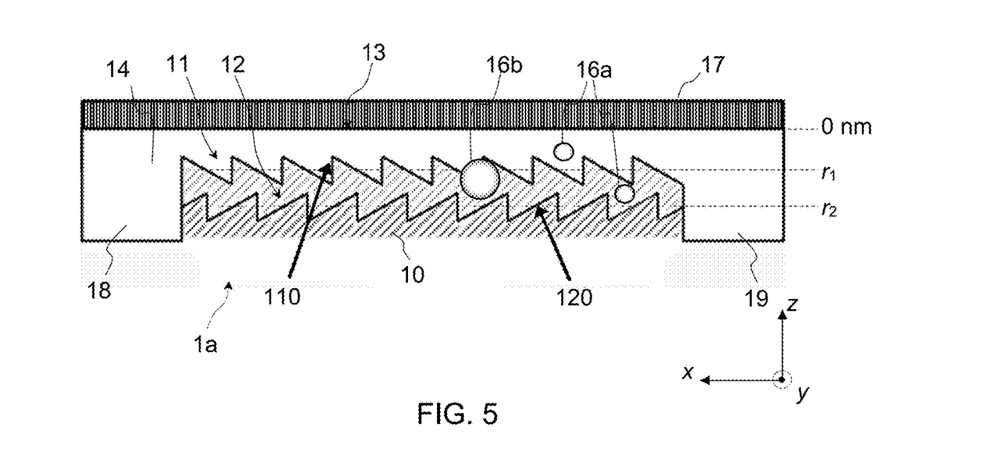
FIG. 5 is a 2D cross-sectional view of a device such as depicted in FIG. 4.

As also seen in FIGS. 1 and 5, the present devices 1, 1a further comprise a lid 17, i.e., an upper layer, which may be more or less structured, and forms a cover. The lid 17 is arranged opposite to and at a distance from the upper surface 13 of the substrate 10, so as to face the bottom wall of the channel 11, 12. As for instance depicted in FIGS. 1-3, because the lower wall is patterned in a superficial thickness of the substrate 10, the average depth of the channel is typically recessed by a distance r, owing to the fabrication process used. In order to allow particles 16 to reach into the channel 11, the lid 17 further need be at a distance g from the upper surface 13 of the substrate, in which the channel 11 is patterned. I.e., a minimal gap g need be ensured, as discussed later in detail. More generally, the channel will be at least partly defined in or on the substrate, and partly defined by the lid, which faces and, thus, partly closes the channel.

The bottom wall and the lid 17 are otherwise designed to allow like sign charges to accumulate at the corresponding (internal) surfaces, in presence of a polar liquid 14 (i.e., a liquid having polar molecules, exhibiting a net dipole moment, such as water). In operation, the polar liquid 14 is introduced and then confined in a ratchet channel 11, 12, between the bottom wall of the channel and the lid 17. The bottom wall and the lid typically involve dielectric materials, whose internal surfaces allow a superficial charge density, in contact with a polar liquid. Similarly, electric charges are likely to accumulate at the surface of the nanoscale particles 16, which, together with the polar liquid, form a suspension. I.e., the nanoscale particle should obviously be distinguished from molecules, atoms or ions of the polar liquid, be it because of their dimensions. The nanoscale particles 16 can typically be metallic spheres, or beads, quantum dots, bio-molecules, or beads with specific molecules bonded at their periphery, etc. In general, many types of nanoscale particles as routinely used in nanofluidic devices can be contemplated for the present purpose.

As we shall see, the formation of superficial charges and the energy landscape allow displacement of nanoscale particles 16 in the polar liquid 14, along a main direction x of the channel 11, 12, under application of an alternating force to such particles 16. The main direction of the channel 11, 12 can be regarded as a longitudinal direction of this channel, although the channel need not necessarily be formed as a straight channel.

Figure 3:
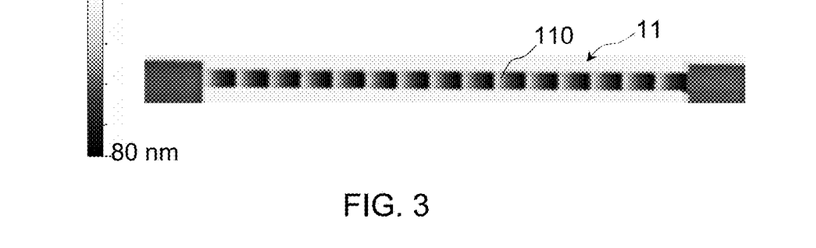
FIG. 3 is a top view of such a channel.

The steps of the channel 11, 12 extend, one after the other, along the longitudinal direction x of the channel. In simple implementations (such as in FIG. 1), a single line of steps is involved, which forms a single channel. In that case, the width of a channel is defined by the width of a single step (as seen in FIG. 3). However, the width of a channel may extend across a substantial part of the upper surface 13 of the substrate 10. In more sophisticated embodiments, several lines of distinct ratchets 11, 12 are involved, as discussed below in reference to FIGS. 4 and 5.

Figure 2:
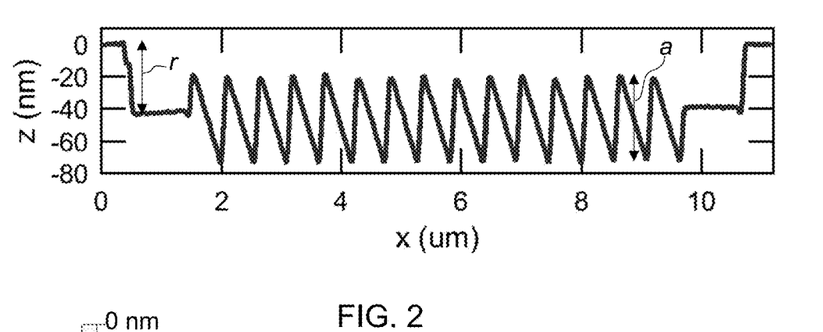
FIG. 2 shows an experimental measure of the depth of asymmetric steps of a channel of a device such as shown in FIG. 1.

The asymmetric steps may for instance have a sawtooth profile, which may be compared with a sawtooth wave or saw wave, bearing resemblance with teeth of a plain-toothed saw although the rake angle of the saw is not necessarily zero here (merely because of the fabrication processes available). The depth a of a step corresponds to the amplitude of the sawtooth wave profile in that case, as illustrated in FIG. 2.

Still, other asymmetric profiles may be contemplated. In all cases, the steps will exhibit at least two distinct slopes, i.e., with at least one slope in each direction (x and −x), where the slopes differ (in absolute values). In FIG. 2, the steps smoothly ramps upward (to the left) and then sharply drops. Thus, one may say a first slope (of lowest absolute steepness) is oriented to the left (it is positive in the direction x), while the second, steepest slope is oriented to the right (and is positive in the direction −x). The first slope (in direction x) impacts the barrier that particles 16 need to overcome to jump to a next step. The second (steepest) slope determines, in the opposite direction, the maximal force applicable so that particle do not flow back to the right. It will be appreciated that the ratio of these two slopes determines properties of the device. More generally though, one understands that asymmetric steps allow particle motion in one direction only, so as to achieve a linear ratchet.

Present Inventors have discovered that accurate, asymmetric steps could be repeatedly fabricated with nanometer-range depths. I.e., lithographically patterned 3D topographies allow 2D energy landscapes to be achieved for nanoparticles, where the complexity of the landscapes exceeds mere recess geometries. This way, clean ratchet topographies can be obtained, which allow sufficiently strong potential landscapes, whose confinement energies (at each step) are typically between 2 and 10 $k_B T$, and typically on the order of 5 $k_B T$. That is, in embodiments, the contiguous steps 110, 120 are designed so as to result in a static energy landscape, according to which said particles 16 are confined in the steps 110, 120 if no alternating force is applied, and wherein confinement energies of the contiguous steps are, on average, between 2 and 10 $k_B T$ for each step.

The present devices 1, 1a can for instance be obtained by thermal scanning probe lithography (or tSPL for short), which has recently demonstrated absolute depth accuracy in the nanometer range. The substrate may for instance comprise a thermally sensitive polymer, such as polyphthalaldehyde (PPA). Yet, other materials can be contemplated. In particular, a pattern as initially obtained (e.g., by thermally patterning PPA), may be transferred to other materials, e.g., using dry etching. In general, suitable materials are materials such as oxides, which spontaneously charge in contact with water or other polar liquids. Examples of suitable materials are silicon oxide and aluminum oxide, which negatively and positively charge, respectively, under intermediate pH conditions. Also, the top surface (lid) will likely be made from a material having similar properties (like glass or oxides). This way, like sign charged surfaces can be achieved.

The resulting devices allow rocking Brownian motors to be achieved, by applying an alternating force to the nanoparticles, at which superficial charges accumulate too. Such forces may for example originate from an alternating electric field or, more generally, an alternating electro-magnetic optical field (also called optical field), or, still, an alternating liquid flow, applied along the channel (although no net fluid motion need be involved).

As it may be realized, two or more of these types of alternating fields may be combined. As it may further be realized, like charged surfaces are needed, in order to be able to generate an asymmetric static energy landscape for the particles and, this, irrespective of the type of field applied. In operation, a polar liquid 14 containing the particles 16 is confined in the channel 11, 12, between the lower wall (as defined in the substrate 10) and the upper lid 17 (whose lower surface provides an upper confinement wall), at which like sign charges accumulate. Adequate liquids will typically have a dielectric constant of more than 10 at room temperature, to be considered to be polar enough. Still, liquid with higher dielectric constant can be used, such as water. The interplay between the modulated lower wall and the upper wall (lid) 17 is what makes it possible to obtain the desired energy landscape.

The rocking Brownian motor accordingly obtained may notably be used to move nanoparticles along the ratchets and, in particular, to efficiently sort nanometric particles of different sizes, as discussed below in detail, in reference to FIGS. 4 and 5.

Referring now more particularly to FIG. 1, an alternating electric field can be relied upon. To that aim, embodiments of the present devices 1, 1a involve electrodes 15, which are configured to allow an alternating electric field to be applied, i.e., to apply a force on particles 16 in the polar liquid 14 confined in the channel 11, 12. The bottom wall of the channel 11, 12 and the lid 17 are otherwise designed to allow displacement of the particles 16, under application of the alternating electric field, as explained earlier. Interestingly, particle displacement can be achieved without net motion of the polar liquid 14, which simplifies the structure of the microfluidic device 1, 1a, inasmuch as no fluid circulation is required.

As seen in FIG. 1, electrodes 15 are typically arranged on each end of a channel 11. The electrodes 15 may for instance be in direct contact with the liquid 14, as assumed in FIG. 1. However, they may, in variants, be isolated from the liquid 14, thanks to a thin material layer (not shown).

The electric field is typically applied via a controller 30. Yet, the controller 30 need not necessarily be part of the microfluidic device 1, 1a. Indeed, the device 1, 1a is a microfabricated device, which makes it difficult (though not impossible) to integrate such a controller. Rather, this controller 30 will typically be coupled to the device 1, 1a, to form a microfluidic system, as described latter in detail.

As illustrated in FIGS. 1-5, the present devices 1, 1a can involve contiguous steps 110, 120 that have a sawtooth profile along the main direction x of their respective channels 11, 12, as described earlier. In terms of dimensions, each of the steps 110, 120 will have an amplitude a (see FIG. 2), which, on average, can be between 3 nm and 300 nm. This amplitude is measured along z, i.e., perpendicularly to the average plane of the substrate, parallel to a plane (x, y). In embodiments, this amplitude is between 20 nm and 200 nm (on average). It may for instance be on the order of 50 nm, as assumed in FIG. 2. This amplitude measures the local depth of the steps; it is measured peak-to-peak, i.e., as an amplitude. The amplitude of the steps locally modulates the distance to the upper lid 17, so as to achieve an energy landscape. Of course, the surface roughness of the substrate 10 need be substantially smaller than the depth of the steps (at least at the level of the recess r). On the other hand, each step will typically have an extension that can be, on average, between 20 nm and 10 000 nm. The extension of the steps is measured along the main direction x of the channels 11, 12. Again, this is more the ratio of the asymmetric slopes of the steps that matters, rather than their absolute dimensions.

The steps 110, 120 can form a periodic structure of steps, along the main direction x of their respective channel 11, 12. That is, each of the contiguous steps has, in a same channel, essentially a same amplitude, same slopes and a same extension, subject to tolerances allowed by the fabrication process used (e.g., tSPL, as in some embodiments). This mitigates erratic behaviors of the particles as they are being displaced through the channels and makes the system more predictable. It should be noted that present ratchets typically involves at least 10 or 15 contiguous steps, as opposed to a few geometric recesses. Yet, many more steps may be achieved, e.g., more than 20, 30, 50 or even 100, following the same principles, in embodiments. For instance, present inventors have obtained ratchets of hundreds of identical steps, subject to 1-3 nm deviations.

As evoked earlier, an important parameter is the distance between the lid 17 and the bottom wall of the channel 11, 12. In that respect, referring back to FIG. 1, the present devices 1, 1a can be designed such that a minimal gap d between the bottom wall of a channel 11, 12 and the upper lid 17 is between 10 nm and 300 nm. The total gap (between the lid and the steps) is locally modulated by the amplitude of the steps, so as to enable an energy landscape. This gap is measured along axis z, i.e., perpendicularly to the average plane of the substrate 10 (parallel to plane (x, y)).

The steps 110, 120 of the channels 11, 12 modulate the effective gap between the bottom wall and the lid and the amplitude of this modulation will, in practice, typically be on the order of the Debye length of the liquid 14 (e.g., 3 to 300 nm). On the other hand, the total, effective distance between the bottom wall and the lid, typically has to be the size of the particle plus 2 to 6 times the Debye length, to achieve efficient particle motions.

As an example of implementation, using Debye lengths of less than 20 nm, present inventors have achieved energy landscapes of up to 10 $k_BT$ in scale at a lateral resolution of less than 100 nm. They have notably obtained nanofluidic rocking Brownian motors for gold nano-spheres of 60 nm diameter, which particles allow for high spatio-temporal resolution (using optical microscopy), revealing all relevant physical system parameters such as the ≈10 nm spatially resolved particle interaction potential (in this example) and the millisecond resolved particle motion in-situ.

For instance, gold particles in electrolyte (Debye length $\kappa^{-1}=15\pm3$ nm) were confined in a nanofluidic slit of modulated gap distance (as in FIG. 1). Closed loop tSPL was used to pattern a thermally sensitive polymer (PPA) with a sawtooth profile of 20 to 60 nm depth and L≈550 nm extension. The surfaces of the nanoparticles, the cover lid (glass) and the polymer were all negatively charged, in presence of the electrolyte. At separations of a few Debye lengths, the particles are repelled from the confining surfaces due to the ion-cloud overlap of the electrostatic double layers at the surfaces. The modulated gap height in the slit results in a static lateral energy landscape experienced by the particles, which provides the static asymmetric potential required for the rocking Brownian motor. Applying an alternating electric field, the nanoparticles could be displaced along the ratchet.

Note that there is a competition between the electrophoretic force $F_{el}$, due to the electric field E on the charged particle, and the electro-osmotic force $F_{eo}$, due to the electric field on counter ions, which induces a fluid flow that, in turn, generates a force on a particle due to Stokes drag. For negatively charged particles $F_{el}$ acts in the opposite direction of the electric field while $F_{eo}$ acts in the direction of the electric field. The present Inventors have repeatedly observed, experimentally, that particles move toward the negative electrode, that is, in the direction of the electric field direction, and thus concluded that $F_{eo} > F_{el}$.

Amongst other applications, present Inventors have demonstrated the possibility to drive particles along strongly curved guiding paths, as well as sorting of 60 and 100 nm particles into opposite directions, within seconds, using distinct types of ratchets. The latter aspect is now discussed in detail, in reference to FIGS. 4 and 5.

Figure 4:
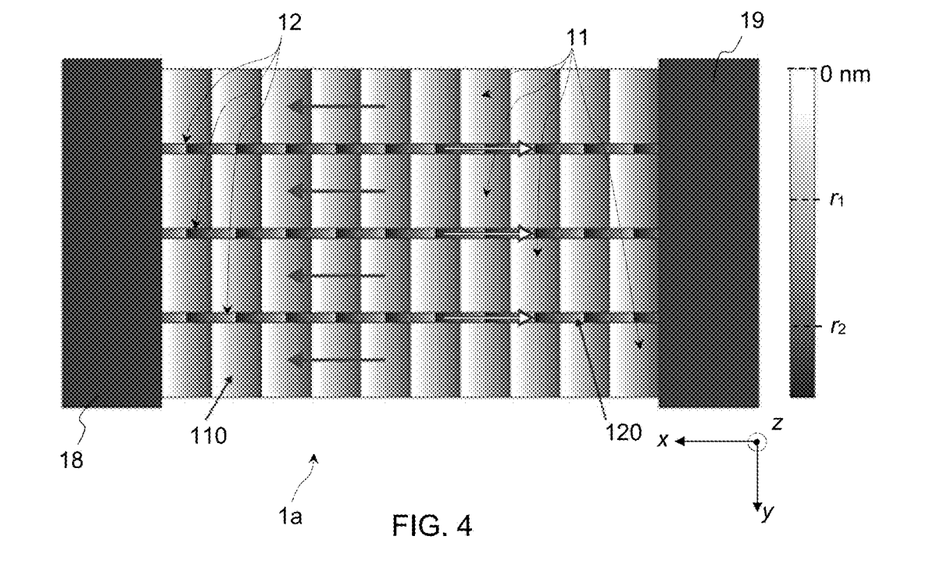
FIG. 4 is a top view of another device, involving multiple, interleaved ratchet channels of reverse symmetries, designed so as to allow displacements of nanoscale particles in opposite directions, according to embodiments.

In embodiments such as depicted in FIGS. 4, 5, the microfluidic device 1a includes several channels 11, 12, forming respective, distinct ratchets. That is, in addition to a first channel 11, forming a first ratchet topography, the device 1a may further comprise at least one second channel 12 (also defined in the substrate 10, on the same upper surface of the substrate 10), whose bottom wall also comprises contiguous steps 120. As in the first channel 11, steps 120 have an asymmetric profile (along the main direction x of the second channel 12), so as to form a second ratchet. Yet, the asymmetry of steps 120 is "reversed" with respect to that of steps 110, to allow a reverse motion of nanoparticles. Thus, the natural orientation of the second channel may be taken as the direction −x.

The lid 17 faces each of the first channel 11 and the second channel 12, which extend contiguously, so as to form a pair of contiguous channels 11, 12. The channels 11, 12 allow fluid communication, such that particles 16 in one of the contiguous channels 11, 12 can pass in the contiguous channel, in operation.

Importantly, the average depth of the second channel 12 is larger than the average depth of the first channel 11, as measured along axis z, i.e., perpendicularly to the average plane of the substrate 10. Thus, the second channel is recessed from the first channel, as better seen in FIG. 5. I.e., the second channel is, on average, recessed from the upper surface 13 by a distance $r_2$ that is larger than the distance $r_1$, by which the first channel is (on average) recessed from the upper surface 13. This way, larger particles 16b will most likely be present in the second channel 12, whereas smaller particles 16b may be present in both types of channels 11, 12, at least initially.

As said above, the asymmetric profiles of the contiguous channels 11, 12 are designed so as to allow opposite displacements of the particles in the two types of channels. I.e., the displacement of particles in the second channel 12 will, on average, be opposite to the displacement of particles in the first channel, under application of an alternating force.

More generally, we note that the present devices 1a may comprise one, or two, or more second channels 12, wherein the second channels 12 are interleaved between, i.e., interdigitated with channels 11 of the first type. Fluid communication (from the top) between the channels make sure that particles in a given one of the channels 11, 12 can pass in a contiguous channel. One may thus have several pairs of channels 11, 12, where the pairs extend contiguously, as assumed in FIG. 4. Having several, contiguous channels 11, 12 of different types improves the particle repartition (before sorting) and the sorting process, inasmuch as particle are, statistically speaking, more likely to reach an adapted transport channel.

We note that, contrary to the amplitude a of each step (measured peak-to-peak, like an amplitude), the average depths $r_1$, $r_2$ (see FIG. 2) of steps forming the distinct channels is measured relative to the upper surface 13 of the substrate (as the steps being fabricated as modulated depletions from the upper surface 13), which surface is assumed to be at 0 nm on axis z, see FIG. 5. That is, the depletions forming the steps extend in a superficial thickness of the substrate 10, as seen in FIG. 5. More generally though, present devices can be extended to multiple partitions (m=1, 2, . . . ) of n types of distinct, but contiguous channels, each recessed by a respective distance from the upper surface 13 and, this, as necessary to sort particles of n different sizes. That is, a device 1a as shown in FIG. 4 can be scaled up to sort a mixture of different species of particles, by simply cascading devices with correspondingly adapted ratchets.

Referring back to the example of FIGS. 4 and 5, here two types of ratchets 11, 12 are combined, which have different depths (and can be different widths too) and opposite transport directions. As we shall see, particles of a certain size are likely to be transported by one of the two ratchet types. Reservoirs 18, 19 can be connected on each end of the ratchets, such that, e.g., a laterally applied oscillating electric field drives the particles in a respective reservoir, depending on their size.

Nanoparticles of different size are dispersed in a polar liquid (e.g., water or any other high dielectric constant liquid) and, before the sorting, can be found randomly distributed over the landscape created by topography and confinement, since all surfaces involved will have a same sign charge, in operation.

Due to the different depth of the two ratchets, the probability distribution along the vertical perpendicular axis depends on the particle size. Larger particles 16b (with more surface charge and less distance to the confining surfaces) are most likely to be found in the deeper written ratchet 12 because the energy penalty of leaving this ratchet 12 is higher. In contrast, smaller particles 16a (with less surface charge can also be found within the shallow ratchet 11 with a reasonable probability).

The probability to find a small particle 16a outside the deeper ratchet 12 can be tuned by adapting the width of the ratchets 11, 12 along the y-axis. Thus, in order to get a sufficiently high probability of finding small particles outside the second (deeper) ratchet 12, the width of the latter (as measured along the y-axis) can be less than (and likely small in comparison to) the width of the first ratchets 11. For example, in embodiments, the average width of the second channel 12 is between 70 nm and 280 nm, while the average width of the first channel 11 is between 500 nm and 10 000 nm.

Figure 6:
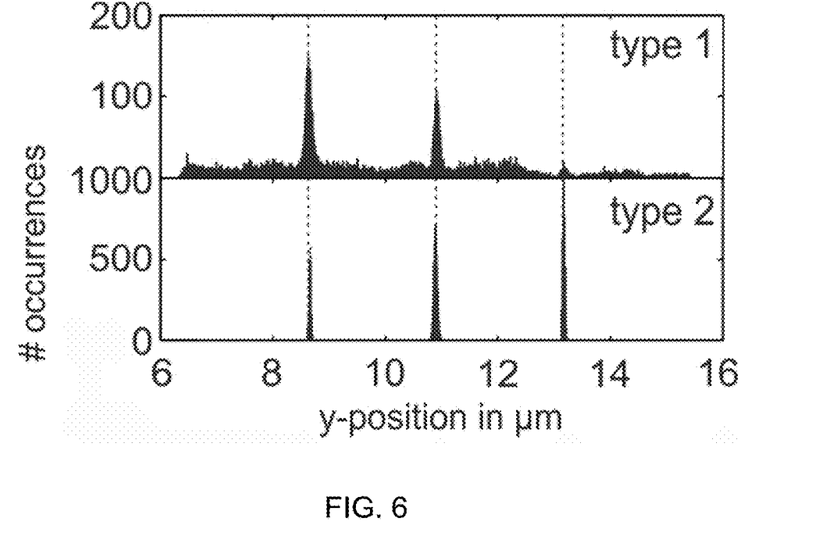
FIG. 6 is a graph representing experimentally measured distributions of two types of nanoscale particles, in a device such as depicted in FIG. 4, with respect to their positions along axis y.

This is illustrated in FIG. 6, where spherical gold nanoparticles (negatively charged in the electrolyte 14) were used, as a test, to experiment sorting capabilities of a device 1a comprising three deep ratchets 12 (40-60 nm depth) interdigitated with four shallow ratchets 11 (20-40 nm depth), all patterned in PPA, as in the example of FIG. 4. Spatial distribution and histograms of the median relative brightness of the particle trajectories were observed before and after the sorting process. FIG. 6 shows an example of histogram as obtained before sorting. Here, smallest particles ("type 1") could be found somehow equally distributed across the channels, whereas larger particles ("type 2") were essentially seen in the deeper ratchets (before sorting). Incidentally, from the initial histogram, the effective (one-dimensional) interaction energy to which particles are subject can be extrapolated using the Boltzmann distribution.

Figure 7A:
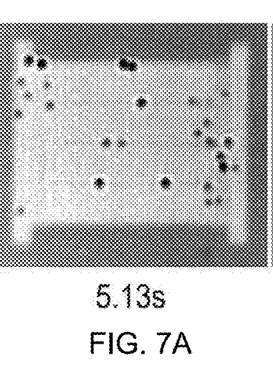
FIGS. 7A-C are screenshots (photographs extracted from a movie obtained by optical microscopy) representing the evolution of the repartition of nanoparticles of different sizes in a device such as depicted in FIG. 4, while sorting the particles by application of an alternating force, according to embodiments.

In operation, an alternating (i.e., oscillating) force is switched on to bring the whole system out of equilibrium, as illustrated in FIG. 7A. Accordingly, the ratchets 11, 12 start to work as Brownian motors and since the transport directions of the deep and shallow ratchets are opposite and the probability density along the y-axis depends on the size of the particles, the particles effectively get sorted with respect to their size.

Figure 7B:
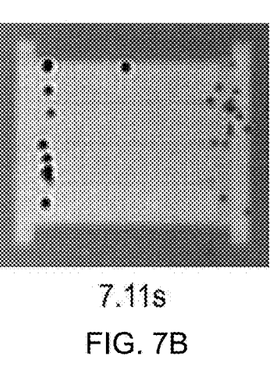
Figure 7C:
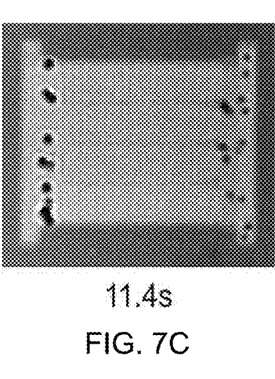

For example, referring back to the previous example of 60 nm and 100 nm in a device 1a such a depicted in FIG. 4: here, because the ratchet energies are too low ($\approx$2 kBT) for the 60 nm particles in deep ratchet and too high ($\approx$10 kBT) for the 100 nm in shallow ratchet, the particles happen to get effectively transported by respective types of channels, in opposite directions. Thus, a sorting process is achieved, whose duration is typically of a few seconds, as illustrated in FIGS. 7B and 7C. In the example of FIG. 7, an AC voltage of 4V (alternating at 30 Hz) was applied to electrodes (not shown), arranged at ends of the channels, as in FIG. 1.

Beyond this example, experiments conducted by the present Inventors led them to conclude that a reasonable average depth of the deeper ratchets 12 should typically be between 30 nm and 300 nm, while the average depth of the shallower ratchets 11 can be of at least 20 nm. These average depths are measured with respect to the upper (free) surface 13 of the substrate 10.

As said earlier, the depths of the steps 110, 120 in the channels 11, 12 result in a modulation of the gap distance between the bottom wall and the upper wall 17, whose amplitude a need typically be, in practice, on the order of the Debye length (e.g., 3 to 300 nm), whereas the total gap distance d+r typically has to be the size of the particle plus 2 to 6 times the Debye length. The second ratchets are deeper than the first's, the difference being on the order of the Debye length or less. The height difference results in an energy barrier and need be carefully refined. Else, if the step is too big, smaller particles 16a will also be confined to the second ratchet.

As evoked earlier, the present invention may further be embodied as a microfluidic system, i.e., a system that comprises a microfluidic device 1, 1a as described herein, and, in addition, a voltage controller 30. The controller is adapted for applying a voltage to electrodes 15 in the device 1, 1a, as for instance depicted in FIG. 1. In general, the voltage controller 30 will be adapted for applying a voltage of 0.1 to 10 volts with an oscillating frequency that is between 5 and 1 000 Hz. Yet, this value depends on the distance between the electrodes 15. In practice, 0.1 V should be sufficient to drive motors with long pitches in the ratchet elements and low amplitude.

If necessary, the voltage controller 30 may be adapted for applying a rotating voltage to at least three electrodes 15. For example, a rotating voltage of 3V may be applied, which has an oscillating frequency of 30 Hz. In exemplary embodiments, four electrodes may be used in combination with square waves applied with a 90 degree phase shift.

In accordance with a further aspect, the present invention can further be embodied as a method for displacing or sorting particles 16, 16a, 16b in a microfluidic device 1, 1a such as described above, as illustrated in FIG. 7.

Essential aspects of such methods have already been described. They generally rely on a microfluidic device 1, 1a, provided with particles 16, 16a, 16b in a polar liquid 14 that is confined in the channel(s) 11, 12 of the device 1, 1a. In addition, and as described earlier, an alternating force need be applied to particles in the liquid 14, so as to displace the particles along a main direction (x, or −x) of the channel(s) 11, 12. An alternating electric field can be applied, e.g., based at least in part on a voltage controller as in FIG. 1.

Such a method is advantageously implemented in a device 1a such as depicted in FIG. 4, wherein the device 1a is provided with particles of different sizes in a liquid 14 confined in the various channels 11, 12 of the device 1a. Then, an alternating force is applied to the particles to displace them along the channels 11, 12. As explained earlier in reference to FIG. 7A-7C, this can be done so as for smaller ones of the particles 16a to be more likely displaced in one direction x, along channels 11 of a first type, while and larger ones of the particles 16b will more likely be displaced, in an opposite direction −x, along channels 12 of the second type. Eventually, the particles 16a, 16b accordingly sorted can be collected at the ends of the channels 11, 12, e.g., thanks to suitably located reservoirs, as seen in FIGS. 4, 5 and 7.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly mentioned may be contemplated, be it in respect of the substrate 10, the lid 17, or the particles 16, 16a, 16b.

What is claimed is:

1. A method for displacing nanoscale particles in a microfluidic device, wherein the method comprises:
    providing a microfluidic device that comprises:
        a substrate with a channel defined therein, on an upper surface of the substrate, wherein a bottom wall of the channel comprises several contiguous steps having an asymmetric profile along a main direction of the channel, so as to form a ratchet topography; and
        a lid, opposite to and at a distance from said upper surface, so as to face the bottom wall of the channel, wherein the bottom wall and the lid are designed to allow like sign charges to accumulate thereat, in presence of a polar liquid confined in the channel between the bottom wall and the lid, so as to allow displacement of nanoscale particles in the polar liquid, along said main direction of the channel, under application of an alternating force to said nanoscale particles, in operation, the microfluidic device provided with nanoscale particles in a liquid confined in the channel of the device, and
    applying an alternating force to nanoscale particles in said liquid to displace the nanoscale particles along a main direction of said channel;
    wherein in the microfluidic device provided:
        said channel is a first channel, forming a first ratchet topography;
    the device further comprising a second channel defined in the substrate, on said upper surface of the substrate, wherein a bottom wall of the second channel comprises several contiguous steps having an asymmetric profile along a main direction of the second channel, so as to form a second ratchet topography;
    the lid faces each of the first channel and the second channel, which extend contiguously, so as to form a pair of contiguous channels, wherein nanoscale particles of a polar liquid that are in one of the contiguous channels can pass in the other one of the contiguous channels, in operation;
    an average depth of the second channel is larger than an average depth of the first channel, as measured in a direction perpendicular to an average plane of the substrate, wherein the second channel is recessed from the first channel, so as for larger ones of the nanoscale particles to be most likely present in the second channel, in operation; and
    the asymmetric profiles of the contiguous channels are designed so as to allow a displacement of nanoscale particles in the second channel that is opposite to the displacement of nanoscale particles in the first channel, under application of said alternating force, in operation,
    and wherein:
        said microfluidic device is provided with nanoscale particles of different sizes in a liquid confined in the channels of the device; and
        an alternating force is applied to said nanoscale particles of different sizes to displace the latter along said channels, so as for smaller ones of the nanoscale particles to be more likely displaced in one direction along the first channel and larger ones of the nanoscale particles to be more likely displaced, in a direction opposite to said one direction, along the second channel.

2. The method according to claim 1, wherein the microfluidic device provided further comprises electrodes configured to allow an alternating electric field to be applied, so as to apply a force on nanoscale particles in a polar liquid confined in the channel, and the bottom wall and the lid are designed to allow displacement of the nanoscale particles under application of said alternating electric field, without net motion of the polar liquid, in operation,
and wherein the method further comprises:
    applying comprises applying an alternating electric field to said liquid, via said electrodes.

3. The method according to claim 1, wherein the method further comprises collecting the oppositely displaced particles at ends of the channels to sort the collected particles.

* * * * *